(12) United States Patent
Sauer et al.

(10) Patent No.: US 9,065,858 B2
(45) Date of Patent: Jun. 23, 2015

(54) METHOD FOR ASSIGNING NETWORK ADDRESSES FOR FANS

(75) Inventors: Thomas Sauer, Idstein (DE); Klaus Teuke, Dörzbach (DE); Markus Humm, Weissbach (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 645 days.

(21) Appl. No.: 13/423,428

(22) Filed: Mar. 19, 2012

(65) Prior Publication Data

US 2012/0239206 A1 Sep. 20, 2012

(30) Foreign Application Priority Data

Mar. 18, 2011 (EP) .................................... 11158908

(51) Int. Cl.
 *G06F 3/00* (2006.01)
 *H04L 29/12* (2006.01)
 *H04L 29/08* (2006.01)

(52) U.S. Cl.
 CPC ........ *H04L 61/2038* (2013.01); *H04L 61/6095* (2013.01); *H04L 67/12* (2013.01)

(58) Field of Classification Search
 CPC ..................... H04L 29/12207; H04L 12/403
 USPC ............................................................ 710/9
 See application file for complete search history.

(56) References Cited

U.S. PATENT DOCUMENTS

2010/0176931 A1* 7/2010 Bennett ........................ 340/10.4

FOREIGN PATENT DOCUMENTS

| DE | 102 40 832 A1 | 3/2004 |
| DE | 10 2004 039 447 A1 | 12/2005 |
| WO | WO 2005/051723 A1 | 6/2005 |
| WO | WO 2009/010745 A1 | 1/2009 |

OTHER PUBLICATIONS

European Search Report—Jun. 17, 2011.

* cited by examiner

*Primary Examiner* — Chun-Kuan Lee
(74) *Attorney, Agent, or Firm* — Brinks Gilson & Lione

(57) ABSTRACT

A method of assigning network addresses for ventilators (3, 4, 5) in a network. Each ventilator (3, 4, 5) has a unique serial number in a serial number memory (8) and a network address in an adjustable network address memory (9). A control unit (1) automatically assigns network addresses to a plurality of ventilators (3, 4, 5). To begin with, all ventilators are assigned an identical start-address as network address, and serial number queries with a serial number mask are sent to the start-address. The serial number mask is comprised of definite and indefinite positions, and the ventilators (3, 4, 5) respond to the serial number mask subject to their serial number. The control unit (1) assigns unique network addresses to the ventilators (3, 4, 5) independently of the responses and/or modifies the serial number mask for further serial number queries.

10 Claims, 2 Drawing Sheets

METHOD FOR ASSIGNING NETWORK ADDRESSES FOR FANS

CROSS REFERENCE TO RELATED APPLICATION

Figure 1:
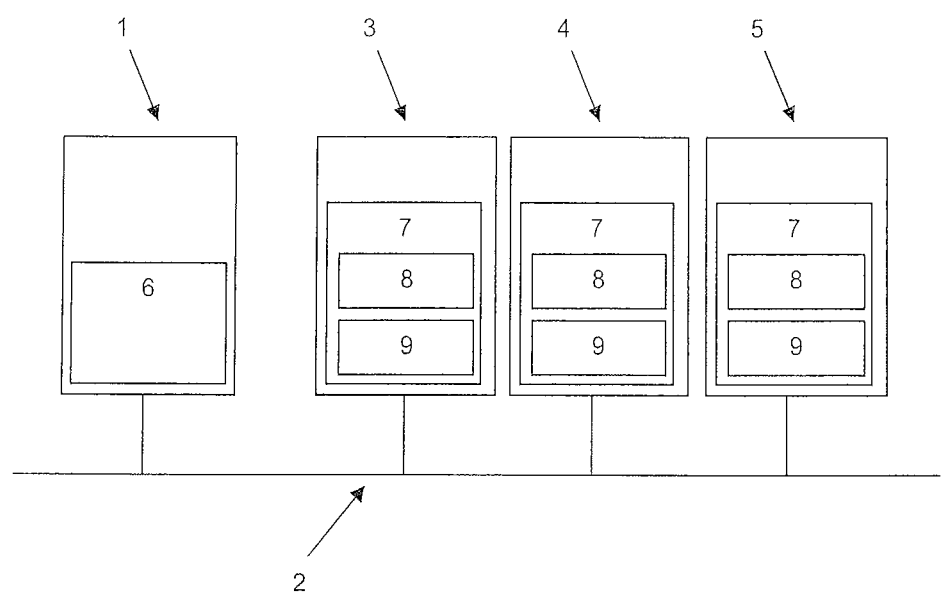

This application claims priority to European Patent Application No. 11158908.1, filed Mar. 18, 2011.

FIELD OF THE INVENTION

The invention relates to a method of assigning network addresses for ventilators in a network, wherein each ventilator has a unique serial number in a serial number memory and a network address in an adjustable memory, and wherein a control unit automatically assigns network addresses to a plurality of ventilators. Furthermore the invention comprises the ventilators and the control unit for use with this method.

BACKGROUND OF THE INVENTION

When using a plurality of ventilators, for example for the ventilation of buildings, there is a need to centrally control the ventilators. In order to do this, the ventilators are connected to one another via a network. In order to efficiently communicate with the individual ventilators in the network, each ventilator must be assigned a unique address in the network.

For this purpose, in a conventional process, the ventilators are manually switched on, one by one, each newly activated ventilator being assigned a unique address before the next ventilator can be switched on. This is repeated until all of the ventilators connected in the network are individually addressable. This kind of method has the disadvantage of requiring many manual switching operations in the installation before all ventilators can be individually communicated with a central control unit via the network.

From DE 10 2004 039 447 A1, a method is known for the automatic assignment of addresses by a master to participants in a system, wherein each participant has an adjustable address memory and is ready-to-receive via a predetermined channel, and wherein, at the beginning of the process, each participant chooses a random address. With this method, the master checks, for the entire valid address space, whether two participants have by coincidence chosen the same random address, and if that is the case, causes each participant to choose a new random address, the previously selected unique addresses of the participants being eliminated as potential new random addresses. This method has the disadvantage that the address space can be very large, particularly in large networks with many participants, and thus a relatively long time passes until the master has queried the entire address space, and each participant possesses a valid individual address.

This invention is therefore based on the task of devising a method of assigning network addresses to ventilators that will make it possible to assign network addresses to the ventilators automatically, as quickly as possible, even in large networks with many participants.

With a method of the kind described above, this task is inventively performed by the control unit assigning all ventilators an identical start-address as a network address at the beginning of the process and sending serial number queries with a serial number mask to the start-address, the serial number mask being comprised of definite and indefinite positions, and the ventilators responding to the serial number mask subject to their serial number, the control unit, depending on the responses from the ventilators, assigning unique addresses and/or modifying the serial number mask for further serial number queries. This has the advantage that the control unit does not have to search the entire address space, or as the case may be, the entire serial number space, in order to identify all ventilators and/or in order to assign them a unique network address.

In one embodiment of the invention, each ventilator whose serial number matches the definite positions of the serial number mask of the serial number query in the same positions responds to the serial number query with its complete serial number. In this way, the control unit can definitely identify the ventilators and administer a table in the memory containing the serial numbers of the ventilators in the network and the network addresses that match them. These serial numbers and network addresses can be accessed by a service technician by means of a display or other output element.

In an additional embodiment of the invention, the control unit, when it receives an error-free response from the ventilator, assigns the ventilator, based on the serial number received, by means of an address assignment command, a unique network address and repeats, after assigning a network address via an address assignment command, the previous serial number query with the same serial number mask in order to identify additional ventilators whose serial numbers fit the serial number mask and assigns them unique network addresses. This is particularly advantageous when the network interface of the ventilators detects a transmission of another participant on the bus and therefore suppresses its response in order to prevent a collision, or when the complete response of a first ventilator is overlaid by a response with the higher signal level of another ventilator. By repeating the serial number query, it is ensured that each serial number that matches the serial number mask is detected and that the respective ventilator can be assigned a unique network address.

In an additional embodiment of an inventive method, the control unit, when it receives an invalid response, sends another serial number query with a modified serial number mask to the start-address, whereby the control unit transforms the next indefinite position of the serial number mask, in the order of significance, into a definite position. This is advantageous, because ventilators are usually produced and sold with ascending serial numbers. When launching a new installation with many ventilators, the serial numbers of the ventilators used will normally lie close together, so that they differ only in the low-order positions of the serial numbers. Because the low-order positions are, to start with, the definite positions, the number of possible collisions between responses is minimized, and all ventilators are identified as quickly as possible by means of their different serial numbers, because as a rule, the higher-order positions are not suitable for distinguishing between ventilators and are masked out by the indefinite positions of the serial number mask.

Preferably, in one embodiment of the invention, the control unit, when there is no response, sends a further serial number query with a modified serial number mask to the start-address, whereby the control unit increases the highest-order definite position of the serial number mask by one character in the serial number alphabet and, if the last character in the alphabet is reached at the highest-order definite position of the serial number mask, and the serial number mask does not have only one definite position, the control unit transforms the highest-order definite position of the serial number mask into an indefinite position.

This embodiment has the advantage that every possible serial number character of the serial number alphabet is queried for the respective definite position of the serial number mask, and if a definite position is no longer needed for further discrimination, it will be transformed once again into an indefinite position in the serial mask, in order to minimize the number of serial number queries required.

BRIEF DESCRIPTION OF THE DRWINGS

Figure 2:
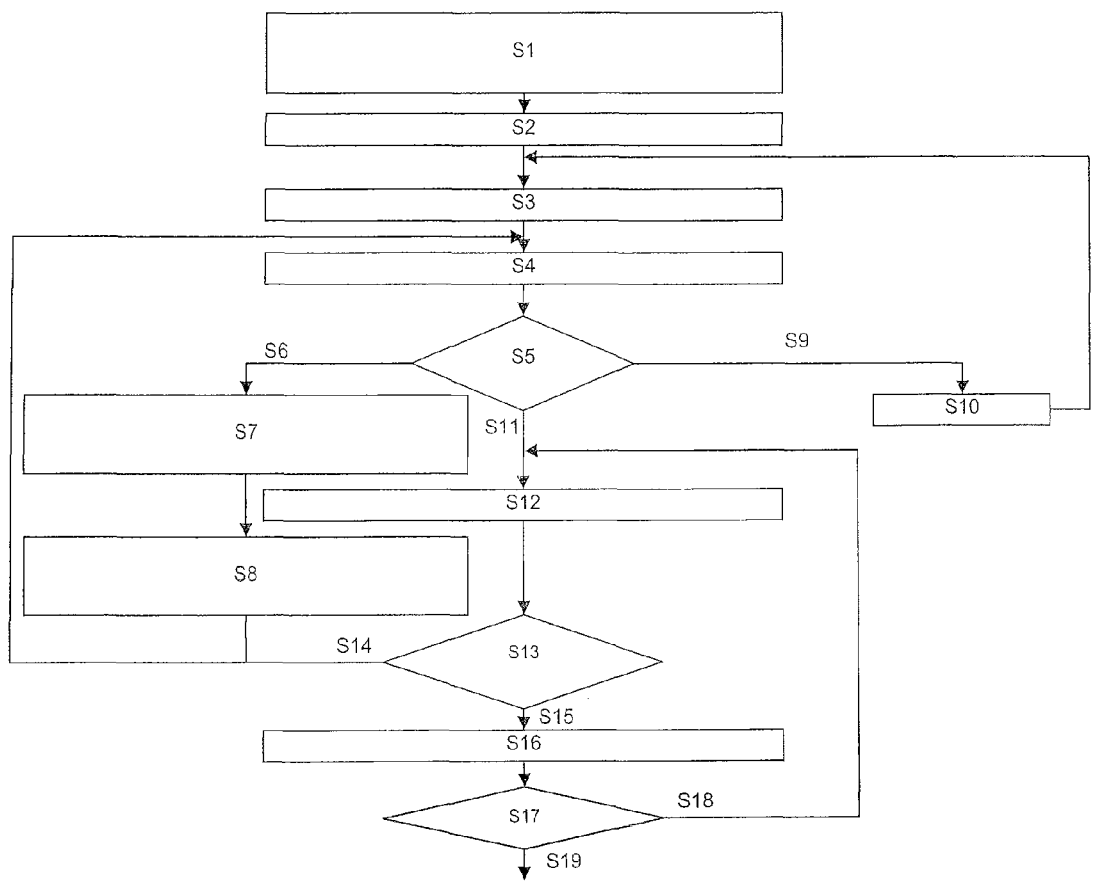

Additional details, characteristics, and advantages of the invention are seen in the dependent claims, as well as in the following description of the appurtenant drawings, in which, for example, a preferred embodiment of the invention is presented. The following is shown:

FIG. 1 is a block diagram of an embodiment of an inventive network for an inventive method with a control unit and ventilators, FIG. 2 is a flow diagram of an inventive method.

The same objects are designated with the same reference signs in the different figures.

DETAILED DESCRIPTION OF THE INVENTION

FIG. 1 shows a block diagram of a network with an inventive control unit 1, a network connection 2, and a plurality of inventive ventilators 3, 4, and 5. The network is, in particular, a serial network with master-slave communication, as for example in an RS485 bus system. The control unit 1 is, in particular, connected as a master with the network via a network interface and transmits commands and/or queries to the ventilators 3, 4, and 5. Furthermore, the control unit 1 has a memory 6 in which it can store the serial numbers and the network addresses of the individual ventilators 3, 4, and 5 that are assigned to the serial numbers. Furthermore the control unit 1 has a memory, which is not shown, for a serial number mask. The ventilators are connected to the network, in particular as slaves, and each of them has a controller 7 which receives the commands and/or queries from the control unit 1 via a network interface and sends responses to the queries. The controllers 7 have a serial number memory 8, which can be read out by the controller, and a network address memory 9, which can be read out and written to the controller 7.

FIG. 2 depicts a flow diagram of an embodiment of an inventive method of assigning network addresses to ventilators. The flow diagram shows the procedure involved in this method from the perspective of a control unit 1, which acts as master in the network.

The inventive method is based on each ventilator, during manufacturing, being assigned a unique serial number consisting of N positions of a serial number alphabet defined by the manufacturer, said alphabet being stored in the serial number memory 8. A possible serial number alphabet could be comprised, for example, of the numbers 0 to 9; however it could also consist of additional letters or any other characters.

In the example of execution of the inventive method, in step S1, by means of an address initialization command, each ventilator is assigned, at the beginning of the process, the same start-address as a network address by the control unit 1, so that all ventilators 3, 4, and 5, have a uniform network address, for example the first possible address 1 in the address space. In this way, queries by the control unit 1 can be sent via the start-address to all ventilators 3, 4, and 5 simultaneously. In the example of execution, the address initialization command is sent via a special broadcasting address provided by the network, for example the address 0, by means of which all ventilators in the network can be activated simultaneously. Normally there is no response to this kind of broadcast address, which is also not required in this case. The assignment command contains the start-address selected by the control unit 1 and is received by each ventilator 3, 4, and 5 via the broadcast, whereby the controller 7 of the ventilator 3, 4, and 5 reads out the start-address from the address initialization command S1 and writes it into its network address memory 9. Alternatively, during manufacturing of the ventilators 3, 4, and 5; an identical start-address can be assigned, in the network memory 9, as a network address, so that in this case, the inventive method is implemented in two process steps: the first during manufacturing and the second during start-up.

After that, a serial number mask is initialized in the control unit 1. The serial number mask has the same number of positions as a serial number and is comprised of definite and indefinite positions. A wildcard character is assigned to the indefinite positions in the serial number mask. The wildcard character is outside the serial number alphabet and serves as a placeholder for any character in the serial number alphabet. A character from the serial number alphabet is assigned to the definite positions. For initialization, in step S2, all positions of the serial number mask are set as wildcard characters, and the position that will now be changed is selected, for example the first position of the serial number mask. Alternatively, however, the process could also start in reverse, and the last position of the serial number mask selected as the definite position to be changed at this time. In the step S3, the definite position of the serial number mask that is to be changed at this time is assigned a starting character, for example the first possible character in the serial number alphabet. Alternatively, however, the process could also start in reverse here as well, and the last character of the serial number alphabet chosen as starting character. Then the serial number mask is first comprised of a definite character at the definite position that is supposed to be changed, and indefinite positions with wild-card characters at all other positions.

In the next step S4, the control unit 1 sends a serial number query to the start-address. The serial number query contains the current serial number mask. The controller 7 of the ventilators 3, 4, 5 receives the serial number query and compares the serial number mask with the individual serial numbers established internally in the serial number memory 8. Here, the digit positions that contain a wild-card character are ignored. The ventilator 3, 4, and 5, whose serial number has the same characters as the serial number mask at the definite digit positions of the serial number mask, responds to the serial number query with a serial number confirmation. In the serial number confirmation, it sends its complete serial number back to the control unit 1.

In step S5 of the process, the control unit 1 waits for a response, i.e. a serial number confirmation. For each serial number query by the control unit 1, there are three possible response scenarios: an error-free response, an erroneous response, or no response.

The first possibility S6 is that precisely one ventilator 3, 4, or 5 responds. In that case, the control unit 1 receives the response as an error-free serial-number confirmation and in step S7, it stores the serial number received in the memory 6 together with the next network address to be assigned, whereby the next network address to be assigned is for example determined by means of an incrementation of the network addresses, commencing with the start-address. After that, the control unit sends an address assignment command in step S8. The address assignment command is sent to the start-address and contains the previously calculated network address that will now be assigned, and the complete, previously-received serial number of the responding ventilator 3, 4, and 5. Alternatively, the network address assignment command could also be sent as a broadcast. The controllers of the ventilators 3, 4, and 5 then receive the address assignment command and compare the serial numbers it contains with their own serial numbers, as established in the serial number memory 8. If they match, the controller 7 of the ventilator in question 3, 4, 5 and writes the received network address into its network address memory 9, so that it now possesses a unique network address at which it can individually receive control data. This also means that it no longer receives additional serial number queries from the control unit 1. There is then a jump back to step S4, and the same serial number query with the same serial number mask is sent once again by the control unit 1. This makes it possible to receive the response of a further ventilator 3, 4, and 5 whose serial number also matches the current serial number mask, and which may have sent a delayed response, or as the case may be may have waited until it could transmit without collision. This is recursively repeated until no ventilator 3, 4, or 5 responds within a certain period of time, after which there is a jump to step S12.

The second possibility S9 is that a plurality of ventilators 3, 4, and 5 will respond simultaneously, because both of their serial numbers match the serial number mask in the definite positions. In this case, there is a collision of responses in the network, which is recognized as an error by the control unit 1. Then the control unit 1 responds with an additional serial number query, in which a new serial number mask with an additional definite position is used. For this purpose, in step S10, the position that is supposed to be changed is incremented by one position, i.e. it is shifted to the next higher-order position, so that a wildcard character is then replaced by an additional definite character, whereby the definite position that was supposed to be changed before remains occupied by the old definite character. There is then a jump back to the step S3, so that the start value is assigned to the new definite position that is now to be changed. This is repeated until all positions in the serial number mask are definite positions, and therefore precisely only one ventilator can respond. However, as the ventilators are as a rule supplied with increasing serial numbers, it is relatively unlikely that the serial number mask will have to have many definite positions in order to get just one or no response. It is more likely that serial numbers of the ventilators will differ in the first positions and match in the other positions, so that many definite positions will only rarely have to be used.

The third possibility S11 is that none of the ventilators 3, 4, or 5 responds, because none of the serial numbers of the ventilators 3, 4, or 5 match the current serial number mask. In this case, in step S12, the serial number mask is changed in such a way that the definite position that is to be changed is now set as the next valid serial number character. In step S13, it is checked whether the end of the serial number alphabet has already been reached. If the end of the serial number alphabet has not been reached, which corresponds to the path S14 in the flow diagram, there is a jump back to step S4, and a new serial number query with the newly calculated serial number mask is transmitted. If the end of the serial number alphabet has been reached, which corresponds to the path S15 in the flow diagram, the definite position that is to be changed is returned, in step S16, by means of a wildcard character to an indefinite position, and the definite position that is to be changed now is reduced by one position, i.e. it is shifted to the next lower-order position. Then, in step S17, it is checked whether the last position that is to be changed now, was the first position. If it was not the first position, which corresponds to the path S18 in the flow diagram, there is a jump back to step S12, so that the next character is assigned to the new definite position that is to be changed now, and the process continues, as described above. If the last definite position that is supposed to be changed now was the first position of the serial number mask, which corresponds to path 19 in the flow diagram, all of the required values of the serial number mask are queried, and all of the ventilators are assigned a unique network address, and the process is ended.

Using the following table, there is illustration of the process involved in an example with three ventilators: V1 with the serial number SN1=211, V2 with the serial number SN2=218, and V3 with the serial number SN3=221.

| # | SNM | S | Response | V1 | V2 | V3 |
|---|---|---|---|---|---|---|
| S1 | — | — | — | 1 | 1 | 1 |
| S2, S3, S4, S5 | **1 | 1 | ERROR1 | 1 | 1 | 1 |
| S9, S10, S3, S4, S5 | *11 | 2 | 211 | 1 | 1 | 1 |
| S6, S7, S8 | *11 | 2 | — | 2 | 1 | 1 |
| S4, S5 | *11 | 2 | TIMEOUT | 2 | 1 | 1 |
| S11, S12, S13, S4, S5 | *21 | 2 | 221 | 2 | 1 | 1 |
| S6, S7, S8 | *21 | 2 | — | 2 | 1 | 3 |
| S4, S5 | *21 | 2 | TIMEOUT | 2 | 1 | 3 |
| S11, S12, S13, S4, S5 | *31 | 2 | TIMEOUT | 2 | 1 | 3 |
| S11, S12, S13, S4, S5 | *41 | 2 | TIMEOUT | 2 | 1 | 3 |
| ... | ... | ... | ... | ... | ... | ... |
| S11, S12, S13, S4, S5 | *91 | 2 | TIMEOUT | 2 | 1 | 3 |
| S11, S12, S13, S15, S16, S17, S12, S13, S14, S4 | **2 | 1 | TIMEOUT | 2 | 1 | 3 |
| S11, S12, S13, S4, S5 | **3 | 1 | TIMEOUT | 2 | 1 | 3 |
| ... | ... | ... | ... | ... | ... | ... |
| S11, S12, S13, S4, S5 | **8 | 1 | 218 | 2 | 1 | 3 |
| S6, S7, S8 | **8 | 1 | — | 2 | 4 | 3 |
| S4, S5 | **8 | 1 | TIMEOUT | 2 | 4 | 3 |
| S11, S12, S13, S4, S5 | **9 | 1 | TIMEOUT | 2 | 4 | 3 |

In the first column #, the process steps per column are shown in the order that leads to the values in the other columns. In the second column, the current serial number mask SNM is given, whereby the symbol "*" stands for a wildcard character in an indefinite position and a numeral for a serial number character in a definite position. In the third column, the definite position S that is to be changed at this time is given. In the fourth column, the response of the ventilators is given, or as the case may be the status of the response in the control unit 1, whereby TIMEOUT means that no response was received, and ERROR means that an invalid response was received due to collision. The last three columns show the network addresses of the three ventilators V1, V2, V3.

In an additional example of execution for the method, which is not shown, there are subsequent additional process steps, by means of which the assigned network addresses of the ventilators are sorted in the order of the serial numbers and reassigned in this order by a series of address-assignment commands, as described in step S8. This has the advantage that with a predetermined spatial arrangement of the ventilators in the order of the serial numbers, the network addresses can be determined by a service technician without additional technical means, based only on the spatial arrangement.

The invention is not limited to the examples of execution that are shown and described here, but rather also encompasses all embodiments that operate, in the sense of the invention, in the same way. For example, instead of a ventilator, another device that also implements the characteristics of an inventive method could be connected to the network, this device then also being assigned a unique network address by the control unit 1. In addition, the network could be comprised of a CAN bus, whereby in this case, instead of network addresses, the object-identifiers and priorities specific to the CAN Bus would be used.

In addition, the invention has not so far been restricted to the combination of characteristics defined in the respective independent claim, but can also be defined by any other combination of specific characteristics of the totality of disclosed individual characteristics. This means that fundamentally, practically every individual characteristic of the respective independent claim can be omitted, or as the case may be replaced by at least one individual feature disclosed in another place in the application. In this respect, the claims are to be understood only as a first attempt at formulation for the invention in question.

While the above description constitutes the preferred embodiment of the present invention, it will be appreciated that the invention is susceptible to modification, variation and change without departing from the proper scope and fair meaning of the accompanying claims.

The invention claimed is:

1. A method of assigning network addresses for a plurality of ventilators (3, 4, 5) in a network and controlled by a control unit, wherein each of the ventilators (3, 4, 5) has a unique serial number in a serial number memory (8) and a network address, the serial number being composed of characters of a serial number alphabet, the serial number alphabet beginning with a first character and ending with a last character, the serial number containing a plurality of positions, in which the characters are arranged in an order of significance from a lowest order to a highest order, and wherein the control unit (1) automatically assigns the network addresses to each of the ventilators (3, 4, 5), the method comprising the steps of: providing an adjustable network address memory (9) for each of the ventilators, assigning to all of the ventilators an identical start-address as the network address, sending serial number queries with a serial number mask are being sent to the network address, wherein the serial number mask has characters of the serial alphabet as definite positions and wildcard characters as indefinite positions, and the ventilators (3, 4, 5) responding to the serial number mask depending on their serial numbers, wherein the control unit (1), subject to the responses, assigns the ventilators (3, 4, 5) unique network addresses or modifies the serial number mask for further serial number queries, wherein the control unit (1) following a received error-free response, assigns to one of the ventilators (3, a, 5), via an address-assignment command, a unique network address based on the received serial number;

wherein the control unit (1), upon receiving an invalid response, sends an additional serial number query, with a modified serial number mask, to the start-address, the control unit (1) transforming a subsequent indefinite position, in the order of significance, into a further definite position;

wherein the control unit (1), absent response, sends another serial number query with a modified serial number mask to the start-address;

wherein the control unit (1) ends the process when the last character in the serial number alphabet has been reached at the highest-order definite position of the serial number mask and the serial number mask has only one definite position; and wherein the control unit (1), after the assignment of a network address via an address-assignment command, repeats the previous serial number query with the same serial number mask in order to identify additional ones of the ventilators (3, 4, 5) whose serial numbers match the serial number mask and assigns to the ventilators (3,4, 5) unique network addresses.

2. The method according to claim 1, wherein each of the ventilators (3, 4, 5) having the serial number which matches the definite positions of the serial number mask of the serial number query in the same positions, responds to the serial number query with a complete serial number.

3. The method according to claim 1, wherein the control unit (1), if it receives no response, increases the highest-order definite position of the serial number mask by one character of the serial number alphabet.

4. The method according to claim 3, wherein the control unit (1), if the last character in the serial number alphabet has been reached at the highest-order definite position of the serial number mask, and the serial number mask does not have only one definite position, the highest-order definite position of the serial number mask is transformed into one of the indefinite positions.

5. The method according to claim 1 further comprising providing a controller (7) of the ventilators (3, 4, 5), following a serial number query by the control unit (1), comparing the serial number mask contained in the serial number query with the serial number of the ventilator (3, 4, 5) stored in the serial number memory (8), and if all the definite positions of the serial number mask match the serial number, the controller sends the serial number to the control unit (1) as a response.

6. The method according to claim 1 further comprising that the controller (7) of the ventilators (3, 4, 5), in response to an address assignment command of the control unit (1), reads out the serial number mask contained in the address assignment command and compares it with the serial number in the serial number memory (8), and if all the definite positions of the serial number mask match the serial number, writing a network address contained in the address assignment command into the network address memory (9).

7. The method according to claim 1 wherein the control unit (1), to begin with, assigns to all the ventilators (3, 4, 5) an identical start-address as the network address.

8. The method according to claim 1 wherein during the manufacture of the ventilators (3, 4, 5), all ventilators (3, 4, 5) are assigned an identical start-address as the network address in the network address memory (9).

9. Ventilators (3, 4, 5) for use with a method according to claim 1.

10. A control unit (1) for use with a method according to claim 1.

* * * * *